(12) United States Patent
Emoto

(10) Patent No.: US 6,364,650 B1
(45) Date of Patent: Apr. 2, 2002

(54) INJECTION APPARATUS WITH LOAD DETECTION BETWEEN SUPPORT MEMBERS

(75) Inventor: Atsushi Emoto, Chiba (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 0 days.

(21) Appl. No.: 09/334,064

(22) Filed: Jun. 16, 1999

(30) Foreign Application Priority Data

Jun. 26, 1998 (JP) .......................... 10-180478

(51) Int. Cl.⁷ ..................... B29C 47/08; B29C 47/92
(52) U.S. Cl. ................. 425/145; 425/149; 425/150; 425/170
(58) Field of Search ................. 425/145, 149, 425/169, 170, 171, 550, DIG. 243, 150; 264/40.1, 40.5

(56) References Cited

U.S. PATENT DOCUMENTS

| | | | |
|---|---|---|---|
| 4,755,123 A | * 7/1988 | Otake ...................... 425/145 |
| 4,758,391 A | 7/1988 | Shimizu et al. |
| 4,851,171 A | 7/1989 | Shimizu et al. |
| 4,879,077 A | * 11/1989 | Shimizu et al. ............ 264/40.1 |
| 5,129,808 A | * 7/1992 | Watanabe et al. .......... 425/145 |
| 5,206,034 A | 4/1993 | Yamazaki |
| 5,209,936 A | * 5/1993 | Ihara et al. ................ 425/149 |
| 5,332,382 A | 7/1994 | Kasai et al. |
| 5,380,181 A | * 1/1995 | Hiraoka et al. ............. 425/145 |
| 5,421,712 A | 6/1995 | Laing et al. |
| 5,645,868 A | * 7/1997 | Reinhart .................... 425/145 |
| 5,679,384 A | * 10/1997 | Emoto ....................... 425/145 |
| 5,714,176 A | 2/1998 | Wurl et al. |
| 5,879,597 A | * 3/1999 | Urbanek ..................... 264/40.1 |
| 5,891,485 A | * 4/1999 | Emoto ....................... 425/145 |

FOREIGN PATENT DOCUMENTS

| | | |
|---|---|---|
| EP | 0 331 735 | 9/1989 |
| EP | 0 350 872 | 1/1990 |
| JP | 2-16023 | 1/1990 |

OTHER PUBLICATIONS

Austrian Patent Office Search Report; Date of Mailing: Feb. 21, 2001; Appln. No. 9902923–3, 5 pages.
Patent Abstracts of Japan, vol. 14, No. 159, Mar. 28, 1990 & JP 02–022025 (Sumitomo Heavy Ind. Ltd.), Jan. 24, 1990.

* cited by examiner

Primary Examiner—Nam Nguyen
Assistant Examiner—Emmanuel Luk
(74) Attorney, Agent, or Firm—Arent Fox Kintner Plotkin & Kahn,PLLC

(57) ABSTRACT

An injection apparatus comprises a cylinder member, an injection member, a first support member, a drive unit, a transmission shaft, a second support member, and load detection unit. The injection member is disposed within the cylinder member such that the injection member can advance and retract. The first support member supports the injection member such that the injection member can rotate. The transmission shaft is connected to the injection member such that the transmission shaft can rotate relative to the injection member and has a rotation transmission portion, to which rotation of the drive unit is transmitted, as well as a motion conversion portion for converting rotational motion to linear motion. The second support member is adapted to allow relative rotation between the injection member and the transmission shaft. The load detection unit is disposed between the first support member and the second support member. When the rotation of the drive unit is transmitted to the transmission shaft via the rotation transmission portion, the rotational motion is converted to linear motion by the motion conversion portion, so that the injection member is advanced so as to perform injection. At this moment, the load detection unit detects the injection force.

7 Claims, 3 Drawing Sheets

INJECTION APPARATUS WITH LOAD DETECTION BETWEEN SUPPORT MEMBERS

BACKGROUND OF THE INVENTION

1. Field of the Invention

The present invention relates to an injection apparatus.

2. Description of the Related Art

Conventionally, in an injection molding machine, resin heated and melted in a heating cylinder is injected into the cavity of a mold apparatus under high pressure so that the cavity is filled with the resin. The molten resin is then cooled and solidified so as to obtain a molded article.

The injection molding machine includes a mold clamping apparatus and an injection apparatus. The mold clamping apparatus is provided with a stationary platen and a movable platen. The movable platen is advanced and retracted by a mold clamping cylinder, to thereby perform mold closing, mold clamping, and mold opening.

The injection apparatus includes a heating cylinder for heating and melting resin supplied from a hopper, and an injection nozzle for injecting the molten resin. Further, a screw is disposed within the heating cylinder such that the screw can be rotated and can be advanced and retracted. The screw is advanced so as to inject the resin, and retracted so as to meter the resin.

There has been provided an injection apparatus for an electric injection molding machine in which an electric motor is used to advance and retract the screw.

FIG. 1 is a schematic view of a conventional injection apparatus used in an electric injection molding machine.

In FIG. 1, numeral 2 denotes an injection apparatus, and numeral 4 denotes a frame of the injection apparatus 2. A heating cylinder 21 is fixedly provided in front (left side in FIG. 1) of the frame 4, and an injection nozzle 21a is provided at the front end (the left-side end in FIG. 1) of the heating cylinder 21. A hopper 21*b* is disposed on the heating cylinder 21, and a screw 20 is disposed within the heating cylinder 21 such that the screw 20 can be rotated and can be advanced and retracted (i.e. moved leftward and rightward in FIG. 1). The rear end (the right-side end in FIG. 1) of the screw 20 is rotatably supported by a support member 5.

Attached to the support member 5 is a metering motor 6 having a speed reduction mechanism. The rotation of the metering motor 6 is transmitted to the screw 20 via a timing belt 7*a*.

Further, a ball screw shaft 8 is rotatably supported on the frame 4 in parallel with the screw 20. The rear end of the ball screw shaft 8 is connected, via a timing belt 7*b*, to an injection motor 9 having a speed reduction mechanism. That is, the injection motor 9 is designed to rotate the ball screw shaft 8. The front end of the ball screw shaft 8 is in screw engagement with a ball nut 5*a* fixed to the support member 5. Accordingly, by driving the injection motor 9 and rotating the ball screw shaft 8 via the timing belt 7*b*, the ball nut 5*a* can be moved axially. A load cell 5*b* is disposed between the support member 5 and the ball nut 5*a*.

In the injection apparatus 2 having the above-described structure, in a metering stage, the rotation generated by the driven metering motor 6 is transmitted to the screw 20 via the timing belt 7*a*, thereby retracting (i.e. moving rightward in FIG. 1) the screw 20 by a determined amount. At this time, resin is supplied from the hopper 21*b*, heated and melted within the heating cylinder 21, and accumulated on the front side of the screw 20.

Further, in an injection stage, the rotation generated by the driven metering motor 9 is transmitted to the ball screw shaft 8 via the timing belt 7*b*, so that the ball nut 5*a* and the support member 5 are advanced (i.e. moved leftward in FIG. 1) with the rotation of the ball screw shaft 8. As a result, the screw 20 is also advanced, and the resin accumulated at the front side of the screw 20 is injected into the cavity of an unillustrated mold apparatus from the injection nozzle 21*a*.

At this time, the force for advancing the ball nut 5*a*; i.e., the injection force imparted to the screw 20, is detected by the load cell 5*b*.

However, in the conventional injection apparatus 2, since the injection force is generated with the rotation of the ball screw shaft 8, the ball nut 5*a* receives a torque corresponding to the screw-engagement angle between the ball screw shaft 8 and the ball nut 5*a*. Therefore, accuracy in detection of the injection force by the load cell 5*b* is lowered.

SUMMARY OF THE INVENTION

An object of the present invention is to solve the above-mentioned problems in the conventional injection apparatus, and to provide an injection apparatus which can detect injection force with improved accuracy.

To achieve the above object, an injection apparatus according to the present invention comprises a cylinder member, an injection member, a first support member, drive means, a transmission shaft, a second support member, and load detection means. The injection member is disposed within the cylinder member such that the injection member can be advanced and retracted. The first support member supports the injection member such that the injection member can rotate. The transmission shaft is connected to the injection member such that the transmission shaft can rotate relative to the injection member and has a rotation transmission portion, to which rotation of the drive means is transmitted, as well as a motion conversion portion for converting rotational motion to linear motion. The second support member is adapted to allow relative rotation between the injection member and the transmission shaft. The load detection means is disposed between the first support member and the second support member.

In this injection apparatus, when the rotation of the drive means is transmitted to the transmission shaft via the rotation transmission portion, the rotational motion is converted to linear motion by the motion conversion portion, so that the injection member is advanced so as to perform injection. At this moment, the load detection means detects the injection force.

Since the load detection means is disposed between the first support member and the second support member, rotation of the injection member imparts no torque to the load detection means. Also, since the load detection means is connected to the transmission shaft via the second support member, rotation of the transmission shaft imparts no torque to the load detection means.

Therefore, accuracy in detection of injection force by the load detection means can be improved.

Another injection apparatus according to the present invention further includes a metering motor, and transmission means for transmitting rotation of the metering motor to the injection member.

Still another injection apparatus according to the present invention includes a heating cylinder, a screw, a support plate, an injection motor, a transmission shaft, a bearing box, and load detection means. The screw is disposed within the heating cylinder such that the screw can be advanced and retracted. The support plate supports the screw such that the screw can rotate. The transmission shaft is connected to the screw such that the transmission shaft can rotate relative to the screw and has a rotation transmission portion, to which rotation of the injection motor is transmitted, as well as a motion conversion portion for converting rotational motion to linear motion. The bearing box is adapted to allow relative rotation between the screw and the transmission shaft. The load detection means is disposed between the support plate and the bearing box.

In yet another injection apparatus according to the present invention, the rotation transmission portion is a spline shaft portion formed on the transmission shaft.

In yet another injection apparatus according to the present invention, the motion conversion portion is a ball screw shaft portion formed on the transmission shaft.

BRIEF DESCRIPTION OF THE DRAWINGS

The structure and features of the injection apparatus according to the present invention will be readily appreciated as the same becomes better understood by referring to the accompanying drawings, in which.

DESCRIPTION OF PREFERRED EMBODIMENTS

Embodiments of the present invention will next be described in detail with reference to the drawings.

Figure 1:
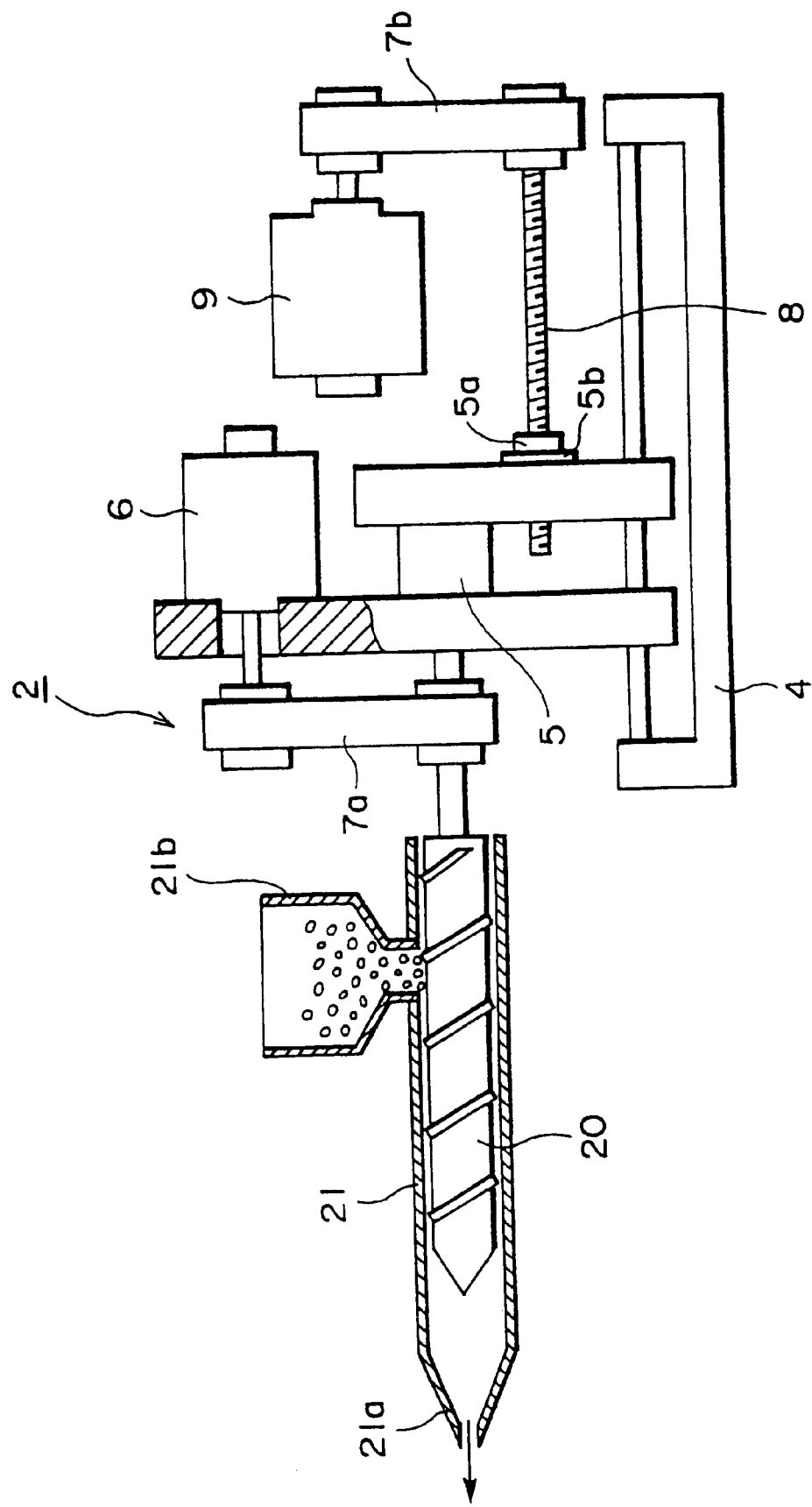
FIG. 1 is a schematic view of a conventional injection apparatus used in an electric injection molding machine.
Figure 2:
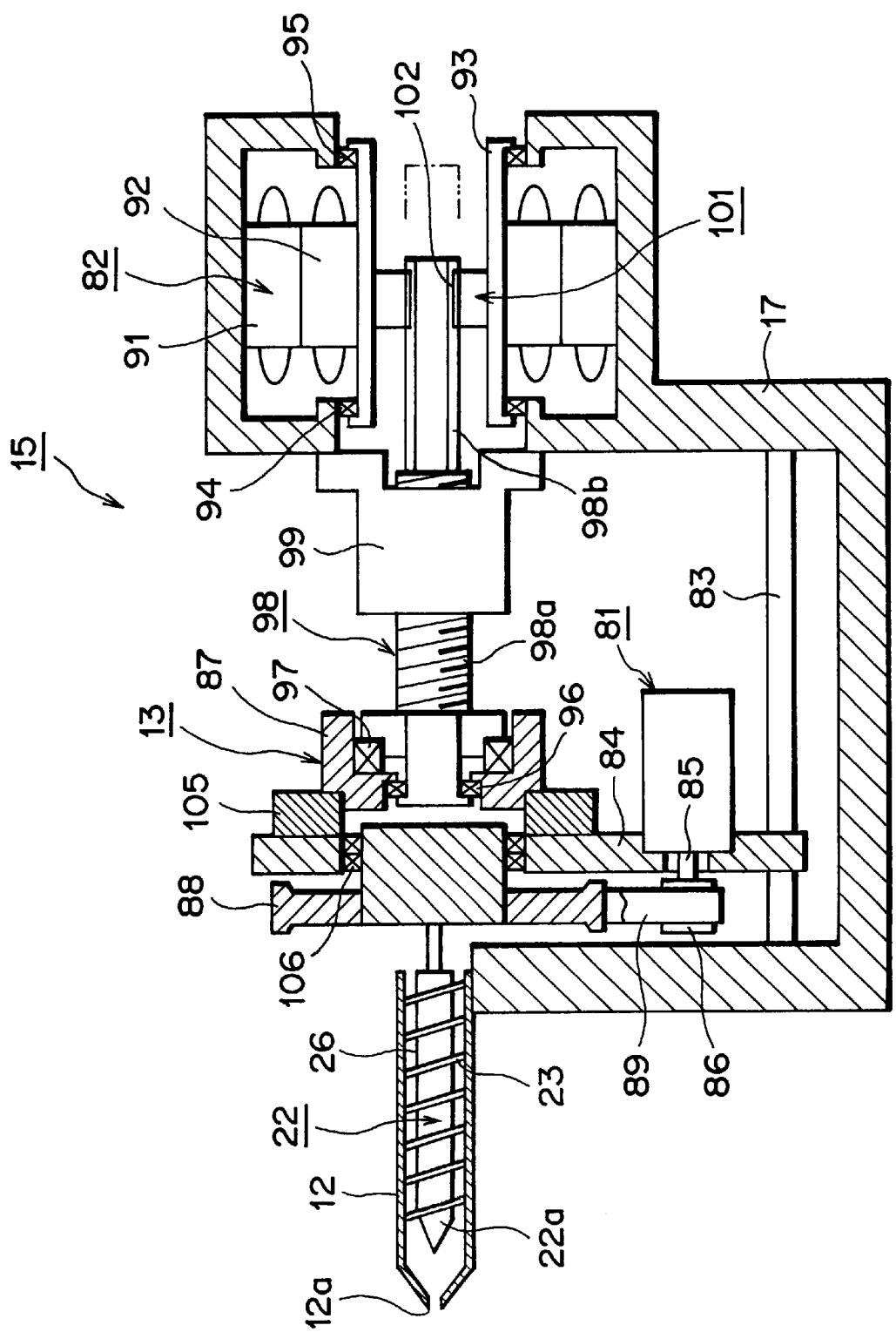
FIG. 2 is a sectional view of a built-in-motor-type injection apparatus according to a first embodiment of the present invention.

FIG. 2 is a sectional view of a built-in-motor-type injection apparatus according to a first embodiment of the present invention.

In FIG. 2, numeral 12 denotes a heating cylinder serving as the cylinder member. The heating cylinder has an injection nozzle 12a at its front end (left-side end in FIG. 2). A screw 22 serving as the injection member is disposed within the heating cylinder 12 such that the screw 22 can rotate and can advance and retract (i.e. move leftward and rightward in FIG. 2).

The screw 22 has a screw head 22a at its front end, and extends rearward (rightward in FIG. 2) within the heating cylinder 12. A bearing box 13 serving as the second support member is fixed at the rear end (right-side end in FIG. 2) of the screw 22. Also, a spiral flight 23 is formed on the peripheral surface of the screw 22, resulting in formation of a groove 26.

An unillustrated resin supply port is formed at a predetermined position on the heating cylinder 12, and an unillustrated hopper is disposed on the resin supply port. The resin supply port is formed at a position such that the resin supply port faces the rear end portion (right-side end portion in FIG. 2) of the groove 26 when the screw 22 is positioned at a forwardmost position (leftward in FIG. 2) within the heating cylinder 12. Also, an unillustrated heater is disposed around the heating cylinder 12.

In a metering stage, the screw 22 is retracted (i.e. moved rightward in FIG. 2) by a predetermined amount while being rotated, so that pellet-shaped resin is fed from the hopper into the heating cylinder 12. The resin is then heated and melted by the heater, and the molten resin is advanced forward (i.e. moved leftward in FIG. 2) along the groove 26, so that the molten resin for one shot is accumulated at the front side of the screw head 22a.

In a subsequent injection stage, when the screw 22 is advanced, the molten resin accumulated at the front side of the screw head 22a is injected from the injection nozzle 12a, and is charged into the cavity of an unillustrated mold apparatus.

At the rear of the heating cylinder 12 is disposed a drive section 15 for rotating, advancing, and retracting the screw 22. The drive section 15 includes a frame 17, a metering motor 81 serving as the first drive means, and an injection motor 82 serving as the second drive means. The metering motor 81 is movably disposed on the frame 17. The injection motor 82 is fixed to the frame 17. The injection motor 82 and the screw 22 are disposed on the same axis.

A guide bar 83 is disposed on the frame 17 such that the guide bar 83 extends parallel with the screw 22. The metering motor 81 is moved along the guide bar 83. For this purpose, a support plate 84 serving as the first support member is slidably supported by the guide bar 83; the metering motor 81 is attached to the support plate 84; and a driven-side pulley 88 is rotatably supported by a bearing 106.

Also, a drive-side pulley 86 is fixed to the output shaft 85 of the metering motor 81. A timing belt 89 is extended between and wound around the drive-side pulley 86 and the driven-side pulley 88. The bearing box 13 is attached to the rear face (the right face in FIG. 2) of the support plate 84 via a load cell 105 serving as the load detecting means. The drive-side pulley 86, the driven-side pulley 88, and the timing belt 89 constitute the transmission means.

The injection motor 82 comprises a stator 91 fixed to the frame 17, and a rotor 92 disposed inside the stator 91. The rotor 92 is rotatably supported by the frame 17. For this purpose, a hollow rotor shaft 93 is fixedly fitted into the rotor 92. The opposite ends of the rotor shaft 93 are supported by the frame 17 via bearings 94 and 95.

Bearings 96 and 97 serving as the support means are disposed within the bearing box 13. The screw 22 is connected, via the bearings 96 and 97, to a ball screw shaft/spline shaft unit 98 serving as the transmission shaft, such that the screw 22 and the ball screw shaft/spline shaft unit 98 are rotatable relative to each other. A ball nut 99 fixed to the frame 17 is screw-engaged with a ball screw shaft portion 98a formed at the front-half portion of the ball screw shaft/spline shaft unit 98. The ball screw shaft portion 98a constitutes the motion conversion portion for converting rotational motion to linear motion. The ball nut 99 and the ball screw shaft/spline shaft unit 98 constitute the motion conversion means.

Consequently, during a metering stage, the rotation generated through drive of the metering motor 81 is sequentially transmitted to the drive-side pulley 86, the timing belt 89, the driven-side pulley 88, and the screw 22, so that the screw 22 is retracted while being rotated. Thus, resin for one shot is accumulated at the front side of the screw head 22a. In this case, the screw 22 and the ball screw shaft/spline shaft unit 98 are rotatably linked to each other via the support plate 84, the load cell 105, and the bearing box 13. Therefore, the rotation transmitted to the driven-side pulley 88 is not transmitted to the ball screw shaft/spline shaft unit 98; however, the pressure of the resin inside the heating cylinder 12 is transmitted to the ball screw shaft/spline shaft unit 98 via the load cell 105 and the bearing box 13. As a result, when the ball screw shaft/spline shaft unit 98 is retracted while being rotated, the screw 22 is also retracted. When the screw 22 is retracted, back pressure is applied to the screw 22 against the pressure of the resin.

When an alternating current of a predetermined frequency is supplied to the stator 91 of the injection motor 82, the screw 22 is advanced. For this purpose, an annular engagement member 101 is fixed onto the inner circumference of the rotor shaft 93 and is located at a substantially central portion thereof, so that a spline 102 formed on the inner circumferential surface of the engagement member 101 is engaged with a spline shaft portion 98b which is formed at the rear-half portion of the ball screw shaft/spline shaft unit 98. The spline shaft portion 98b constitutes the rotation transmission portion to which the rotation of the injection motor 82 is transmitted. The engagement member 101 and the ball screw shaft/spline shaft unit 98 constitute the rotation transmission means.

Consequently, during an injection stage, the rotation generated through drive of the injection motor 82 is sequentially transmitted to the rotor shaft 93, the engagement member 101, and the ball screw shaft/spline shaft unit 98. Since the ball nut 99 is fixed to the frame 17, the ball screw shaft/spline shaft unit 98 is advanced while being rotated, so that the screw 22 is also advanced. At this time, the injection force generated by the screw 22 is transmitted to the load cell 105 via the driven-side pulley 88, and is detected by the load cell 105.

As described above, since rotation of the injection motor 82 is transmitted directly to the ball screw shaft/spline shaft unit 98 without intervention of a speed reduction mechanism, a pulley, and the like, mechanical efficiency can be improved, and inertia can be decreased. As a result, during the injection stage, it becomes possible to shorten the time required for establishing or changing the injection speed and to decrease the torque required for establishing or changing the injection speed. Further, the time required for changeover from the injection stage to the pressure holding stage is shortened.

Since the engagement member 101 is fixed onto the inner circumference of the rotor shaft 93 at a substantially central portion thereof, the spline shaft portion 98b can be advanced and retracted within the rotor 92. Further, the drive-side pulley 86, the driven-side pulley 88, and the timing belt 89, all provided for transmission of rotation of the metering motor 81 to the screw 22, can be disposed to overlap the bearing box 13 in the axial direction. Accordingly, the axial size of the built-in-motor-type injection apparatus can be decreased.

Further, since the load cell 105 is attached to the support plate 84, rotation of the screw 22 or the driven-side pulley 88 never imparts torque to the load cell 105. Moreover, since the load cell 105 is connected to the ball screw shaft/spline shaft unit 98 via the bearing box 13, rotation of the ball screw shaft/spline shaft unit 98 imparts no torque to the load cell 105.

Accordingly, the load cell 105 can detect injection force with improved detection accuracy.

Next, a second embodiment of the present invention will be described.

Figure 3:
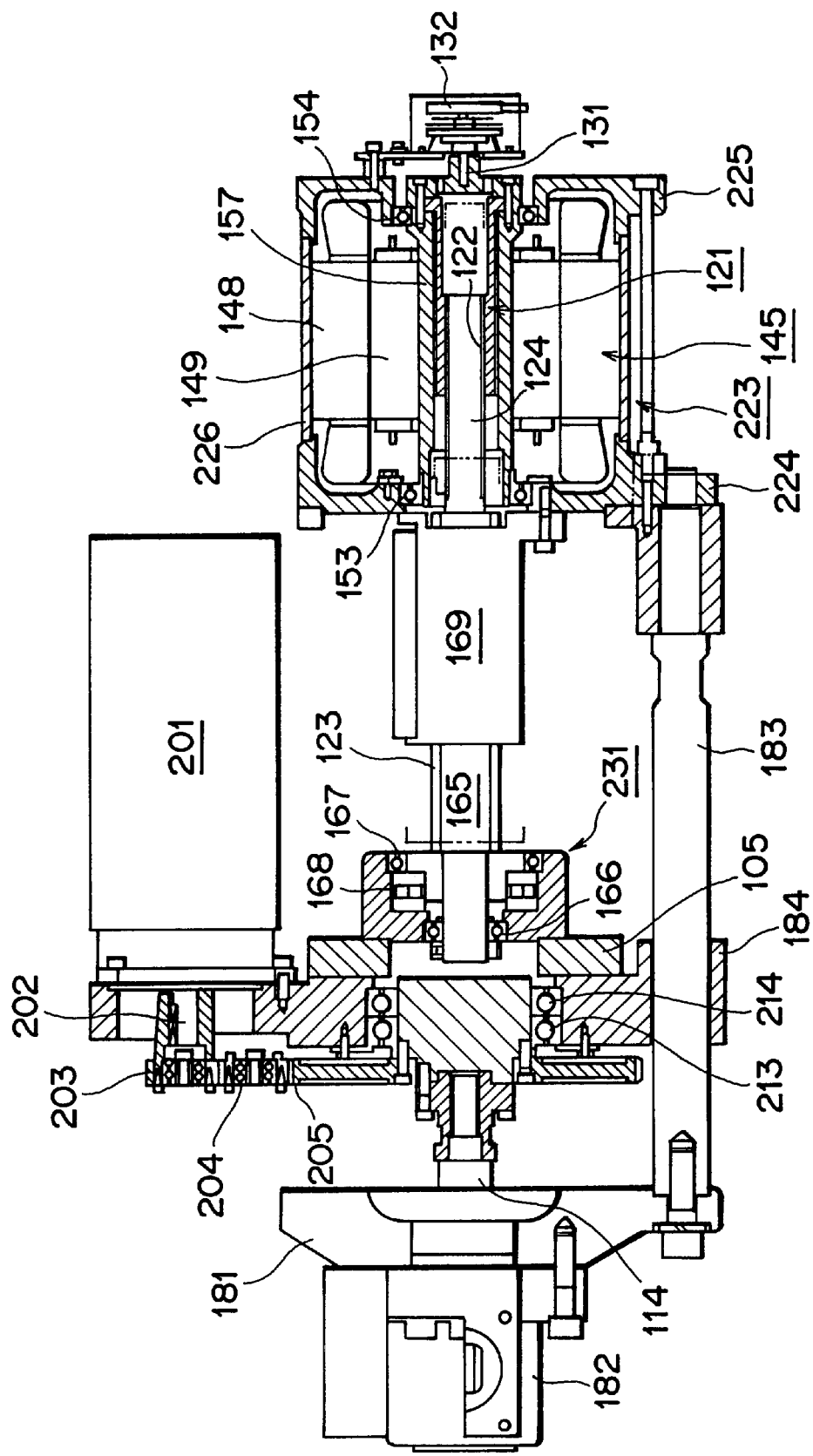
FIG. 3 is a sectional view of a built-in-motor-type injection apparatus according to a second embodiment of the present invention.

FIG. 3 is a sectional view of a built-in-motor-type injection apparatus according to the second embodiment of the present invention.

In FIG. 3, reference numeral 181 denotes a front plate, reference numeral 182 denotes a water-cooling jacket attached to the front plate 181, and reference numeral 223 denotes a rear casing. The rear casing 223 is composed of a cylinder portion 226, and end plates 224 and 225 covering the opposite ends of the cylinder portion 226. An injection motor 145 serving as the second drive means is disposed inside the rear casing 223.

Between the front plate 181 and the end plate 224 is disposed a guide bar 183 extending parallel to an unillustrated screw serving as the injection member. A metering motor 201 serving as the first drive means is moved along the guide bar 183. For this purpose, a support plate 184 serving as the first support member is slidably disposed on the guide bar 183, and the metering motor 201 is attached to the support plate 184. The metering motor 201 and the screw are disposed on different parallel axes, and the injection motor 145 and the screw are disposed on a common axis.

A drive-side gear 203 is attached to an output shaft 202 of the metering motor 201 and is in meshing-engagement with an idle gear 204, which is rotatably supported by an unillustrated front casing. A driven-side gear 205 is rotatably disposed on the support plate 184 via bearings 213 and 214 and is in meshing-engagement with the idle gear 204. Accordingly, rotation generated through drive of the metering motor 201 is transmitted to the rod 114 via the drive-side gear 203, the idle gear 204, and the driven-side gear 205. The drive-side gear 203, the idle gear 204, and the driven-side gear 205 constitute the transmission means.

A bearing box 231 serving as the second support member is attached to the rear face (the right face in FIG. 3) of the support plate 184 via a load cell 105 serving as the load detection means.

The screw can be advanced (i.e. moved leftward in FIG. 3) through drive of the injection motor 145. For this purpose, bearings 166 and 167 as well as a thrust bearing 168 are; disposed inside the bearing box 231; the front end (the left-side end in FIG. 3) of a ball screw shaft/spline shaft unit 165 serving as the transmission shaft is rotataby supported by the bearings 166 and 167; and a thrust load is received by the thrust bearing 168. Further, a ball nut 169 is fixed to the front face (the left face in FIG. 3) of the end plate 224 and is screw-engaged with a ball screw shaft portion 123 formed at the front-half portion of the ball screw shaft/spline shaft unit 165. The ball screw shaft portion 123 and the ball nut 169 constitute the motion conversion portion for converting rotational motion to linear motion. The ball nut 169 and the ball screw shaft/spline shaft unit 165 constitute the motion conversion means.

Further, a tubular engagement member 121 is attached to the rear end (the right-side end in FIG. 3) of the rotor shaft 157. The engagement member 121 extends from the rear end portion (the right-side end portion in FIG. 3) of the rotor shaft 157 to an approximate center thereof, and a spline 122 is formed on the inner circumferential surface of the engagement member 121 at the front end thereof. The engagement member 121 is in spline-engagement, via the spline 122, with a spline shaft portion 124 formed at the rear-half portion of the ball screw shaft/spline shaft unit 165. That is, the front end of the ball screw shaft/spline shaft unit 165 is rotatably supported by the bearing box 231, whereas the rear end of the ball screw shaft/spline shaft unit 165 is rotatably supported by the bearings 153 and 154 via the engagement member 121 and the rotor shaft 157. The spline shaft portion 124 constitutes the rotation transmission portion to which the rotation of the injection motor 145 is transmitted. The engagement member 121 and the ball screw shaft/spline shaft unit 165 constitute the rotation transmission means.

An end cap 131 is fixed to the rear end of the rotor shaft 157. The end cap 131 seals the interior of the rotor shaft 157 in order to prevent invasion of unillustrated foreign matter into the interior of the rotor shaft 157. Further, an encoder 132 is attached to the end cap 131 in order to directly detect the number of rotations of the ball screw shaft/spline shaft unit 165. Accordingly, an unillustrated control section can calculate the position of the ball screw shaft/spline shaft unit 165 on the basis of the number of rotations of the ball screw shaft/spline shaft unit 165.

In this case, rotation of the rotor 149 is transmitted to the ball screw shaft/spline shaft unit 165 via the rotor shaft 157 and the engagement member 121, and the rotational motion is converted to linear motion by the ball screw shaft portion 123 and the ball nut 169, so that the ball screw shaft/spline shaft unit 165 is advanced and retracted. Accordingly, through drive of the injection motor 145, the rotor 149 can be rotated in order to advance the ball screw shaft/spline shaft unit 165 to thereby advance the screw. Injection can be performed in this manner. Numeral 148 denotes a stator.

Next, the operation of the injection apparatus having the above-described structure will be described.

During a metering stage, rotation generated through drive of the metering motor 201 is sequentially transmitted to the drive-side gear 203, the idle gear 204, the driven-side gear 205, the rod 114, and the screw, so that the screw is retracted (i.e. moved rightward in FIG. 3) while being rotated. Thus, molten resin for one shot is accumulated at the front side (left side in FIG. 3) of the unillustrated screw head. The screw and the ball screw shaft/spline shaft unit 165 are connected to be relatively rotatable via the rod 114, the driven-side gear 205, the support plate 184, the load cell 105, and the bearing box 231. Therefore, although rotation transmitted to the driven-side gear 205 is not transmitted to the ball screw shaft/spline shaft unit 165, pressure of resin within the unillustrated heating cylinder serving as the cylinder member is transmitted to the ball screw shaft/spline shaft unit 165 via the rod 114, the driven-side gear 205, the support plate 184, the load cell 105, and the bearing box 231. Accordingly, when the ball screw shaft/spline shaft unit 165 is retracted while being rotated, the screw is also retracted. When the screw is retracted, back pressure is applied to the screw against the pressure of the resin.

Meanwhile, during an injection stage, the rotation generated through drive of the injection motor 145 is sequentially transmitted to the rotor shaft 157, the engagement member 121, and the ball screw shaft/spline shaft unit 165. Since the ball nut 169 is fixed to the end plate 224, the ball screw shaft/spline shaft unit 165 is advanced while being rotated, so that the screw is also advanced.

In the present embodiment, since the load cell 105 is attached to the support plate 184, rotation of the screw or the driven-side gear 205 never imparts torque to the load cell 105. Moreover, since the load cell 105 is connected to the ball screw shaft/spline shaft unit 165 via the bearing box 231, rotation of the ball screw shaft/spline shaft unit 165 imparts no torque to the load cell 105.

Accordingly, the load cell 105 can detect injection force with improved detection accuracy.

Although a screw is used as the injection member in each of the above-described embodiments, a plunger may be used in place of the screw.

The present invention is not limited to the above-described embodiments. Numerous modifications and variations of the present invention are possible in light of the spirit of the present invention, and they are not excluded from the scope of the present invention.

What is claimed is:

1. An injection molding apparatus comprising:
   (a) a cylinder member;
   (b) an injection member disposed within said cylinder member such that said injection member can be advanced and retracted;
   (c) a first support member for rotatably supporting said injection member;
   (d) drive means;
   (e) a transmission shaft connected to said injection member in a relatively rotatable manner, said transmission shaft having a rotation transmission portion, to which rotation of said drive means is transmitted, as well as a motion conversion portion for converting rotational motion to linear motion;
   (f) a second support member configured to allow relative rotation between said injection member and said transmission shaft wherein said second support member and said transmission shaft advance and retract together, maintaining a fixed relationship; and
   (g) load detection means disposed between said first support member and said second support member.

2. An injection molding apparatus according to claim 1, further comprising:
   (a) a metering motor attached to said first support member; and
   (b) transmission means for transmitting rotation of said metering motor to said injection member.

3. An injection molding apparatus according to claim 1, wherein said rotation transmission portion is a spline shaft portion formed on said transmission shaft.

4. An injection molding apparatus according to claim 1, wherein said motion conversion portion is a ball screw shaft portion formed on said transmission shaft.

5. An injection molding apparatus comprising:
   (a) a heating cylinder;
   (b) a screw disposed within said heating cylinder such that said screw can be advanced and retracted;
   (c) a support plate for rotatably supporting said screw;
   (d) an injection motor;
   (e) a transmission shaft connected to said screw in a relatively rotatable manner, said transmission shaft having a rotation transmission portion, to which rotation of said injection motor is transmitted, as well as a motion conversion portion for converting rotational motion to linear motion;
   (f) a bearing box configured to allow relative rotation between said screw and said transmission shaft; and
   (g) load detection means disposed between said support plate and said bearing box.

6. An injection molding apparatus according to claim 5, wherein said rotation transmission portion is a spline shaft portion formed on said transmission shaft.

7. An injection molding apparatus according to claim 5, wherein said motion conversion portion is a ball screw shaft portion formed on said transmission shaft.

* * * * *